June 13, 1939. J. D. CASE 2,162,156
MILK TESTER
Filed March 24, 1938 2 Sheets-Sheet 1
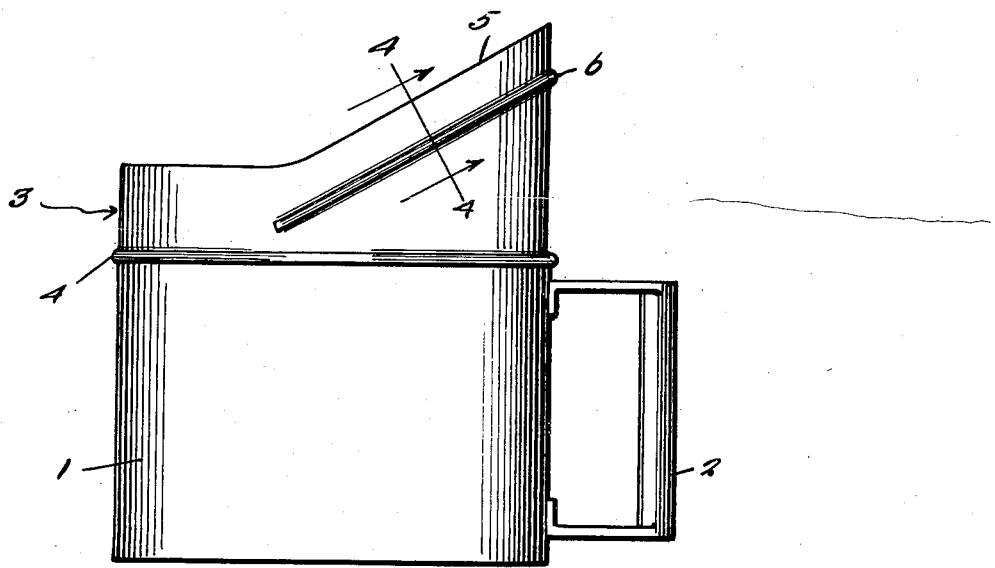
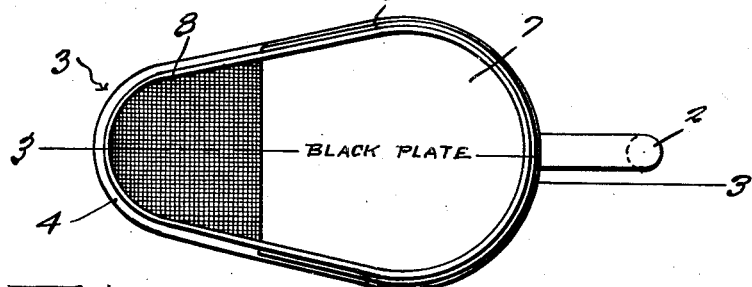
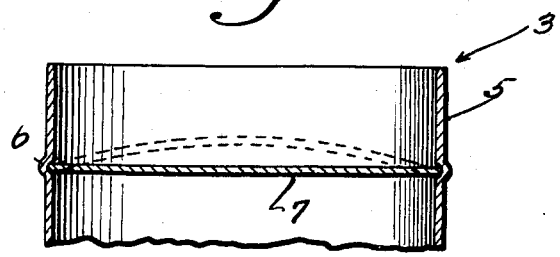
Inventor
John D. Case
By Clarence A. O'Brien
Hyman Berman
Attorneys Inventor
John D. Case By Clarence A. O'Brien
Hyman Berman
Attorneys

Patented June 13, 1939

2,162,156

UNITED STATES PATENT OFFICE 2,162,156

MILK TESTER

John Dumont Case, Clinton, N. J.

Application March 24, 1938, Serial No. 197,924

1 Claim. (Cl. 73—51)

The present invention relates to a novel means for examining milk as it comes from the cow. Milk, due to mastitis, is often watery, flakey, thick in consistency, etc., and this condition is often difficult to detect. It is therefore the primary object of the present invention to provide novel means whereby the detection of the above mentioned conditions in milk will be greatly facilitated.

Other objects of the invention are to provide a milk examining or testing device of the aforementioned character which will be comparatively simple in construction, strong, durable, highly efficient and reliable in use, compact, sanitary and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the invention.

Figure 2 is a top plan view thereof.

Figure 4 is a sectional view through an upper portion of the invention, taken substantially on the line 4—4 of Fig. 1.

Figure 3:
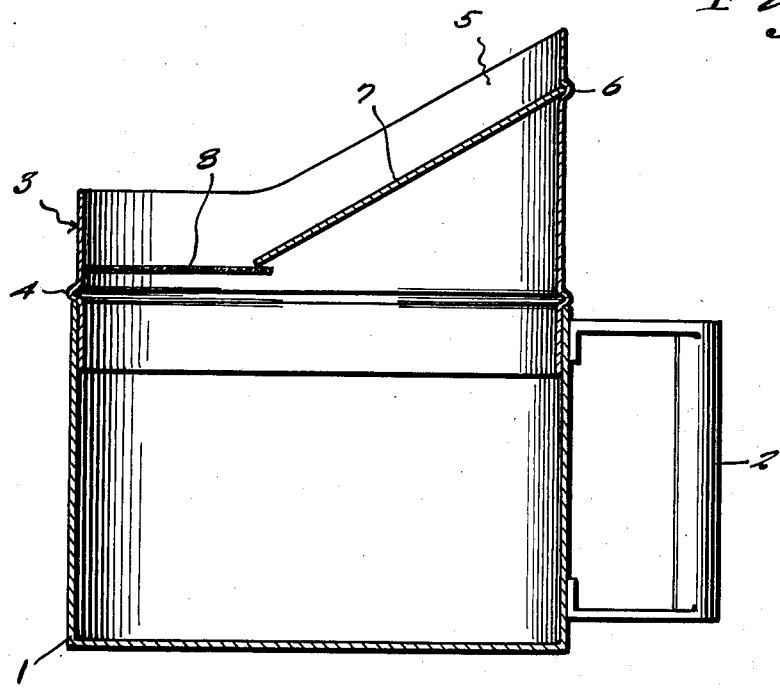
Figure 3 is a view in vertical longitudinal section through the invention, taken substantially on the line 3—3 of Figure 2.
Figure 5:
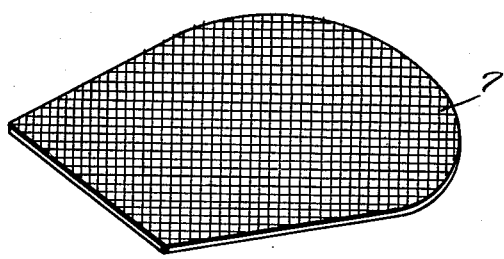
Figure 5 is a detail view in perspective of the inclined plate.

Referring now to the drawings in detail, it will be seen that the embodiment of the invention which has been illustrated comprises a receptacle of suitable material in the form of a cup 1, said receptacle being substantially ovate in plan, as seen in Fig. 2 of the drawings. Mounted on the receptacle 1 is a handle 2. Of course, the receptacle 1 may be of any suitable capacity.

Removably mounted in the upper portion of the receptacle 1 and conforming substantially in shape thereto is a frame 3 of suitable material. The frame 3 has formed in its lower portion an outwardly pressed rib or the like 4 which is adapted to rest on top of the receptacle 1. This is shown to advantage in Fig. 3 of the drawings.

The frame 3 includes an upwardly extending large end portion 5 having formed in its inner periphery a channel 6 for the reception of an inclined plate 7 of any suitable material, preferably metal. The plate is of any suitable color contrasting to that of milk, such as black, as indicated in the drawings. At the lower end of the plate 7 a fine mesh screen 8 is mounted horizontally in the frame 3. The screen 8 is adapted to receive the milk from the inclined plate 7 and said screen extends over that area of the small end portion of the frame 3 which is not covered by said plate 7.

It is thought that the manner of using the device will be readily apparent from a consideration of the foregoing. The device is held in one hand by the handle 2, leaving the other hand free to draw the milk to be tested from the cow. The stream from the teat is directed against the contrastingly colored inclined plate 7 down which it flows by gravity to the screen 8. As the milk thus flows over the plate 7, defects therein may be easily detected. Then, the screen 8 strains coarse particles from the milk as it passes therethrough into the receptacle 1. It will thus be seen that the device provides what may be referred to as a double check on the milk. The particular shape of the frame 3 prevents the plate 7 from sliding downwardly. The plate 7 may be expeditiously mounted in position in the groove 6 by simply flexing said plate, substantially as indicated in broken lines in Fig. 4 of the drawings.

It is believed that the many advantages of a milk examining or testing device constructed in accordance with the present invention will be readily understood and although a preferred embodiment of said device is as illustrated and described, it is to be understood that changes in the details of construction and in the combination and arrangement of parts may be resorted to which will fall within the scope of the invention as claimed.

What is claimed is:

A milk tester of the class described comprising a substantially ovate receptacle, a handle on one end of said receptacle, a frame removably mounted in the upper portion of the receptacle and conforming thereto, said frame including a rib on its outer periphery engageable with the top of the receptacle, the large end portion of the frame having an inclined top extending upwardly from the small end portion of said frame, the large end portion of the frame having a channel in its inner periphery, a black, inclined flat plate removably mounted in the channel, and a horizontal screen mounted in the frame at the lower end of the inclined plate.

JOHN DUMONT CASE.